United States Patent [19]

Massey et al.

[11] 4,391,971

[45] Jul. 5, 1983

[54] COLOR IMPROVEMENT AND ACETALDEHYDE REDUCTION IN HIGH MOLECULAR WEIGHT POLYESTERS

[75] Inventors: Freddie L. Massey, Uniontown; Douglas D. Callander, Akron, both of Ohio

[73] Assignee: The Goodyear Tire & Rubber Company, Akron, Ohio

[21] Appl. No.: 334,769

[22] Filed: Dec. 28, 1981

[51] Int. Cl.³ .............................................. C08G 63/70
[52] U.S. Cl. .................................... 528/481; 210/660; 210/263; 528/485; 528/490; 528/493; 528/502
[58] Field of Search ............... 528/481, 485, 490, 493, 528/502; 210/660, 663

[56] References Cited

U.S. PATENT DOCUMENTS 3,669,931 6/1972 Annis et al. .......................... 528/481
4,223,128 9/1980 Halek et al. .......................... 528/481

Primary Examiner—Lucille M. Phynes
Attorney, Agent, or Firm—Bruce J. Hendricks

[57] ABSTRACT

This invention relates to a method of improving the brightness and color of a polyester resin and reducing the acetaldehyde content by passing the resin through molecular sieves at a temperature of from 230° C. to about 300° C.

9 Claims, No Drawings

COLOR IMPROVEMENT AND ACETALDEHYDE REDUCTION IN HIGH MOLECULAR WEIGHT POLYESTERS

This invention relates to a method for reduction of acetaldehyde and color improvement in high molecular weight polyesters. Polyethylene terephthalate (PET) polymers generally contain small amounts of acetaldehyde. These relatively small amounts of acetaldehyde impart a taste to certain beverages contained in a bottle or other container made of polyethylene terephthalate resin containing aldehyde. It is desirable to have plastic bottles made of polyethylene terephthalate containing only a very small amount of aldehyde or any other material that may give a taste to a drink contained therein. Acetaldehyde is also believed to be the precursor to the other chemical compounds which affect the color and brightness of polyester articles such as films, textiles and containers. By improving the brightness and color, one adds to the appearance and therefore marketability of the polyester product.

BACKGROUND OF THE INVENTION

Acetaldehyde is one of the main precursors for the discoloration of polyethylene terephthalate. Simple and more complex chemical reactions involving participation of $\beta$-hydroxyethyl groups on chain ends or created by polymer chain scission e.g. (by hydrolysis) are major routes to formation of acetaldehyde thermal dehydration of ethylene glycol and diethylene glycol is also known to lead to formation of acetaldehyde.

Acetaldehyde can then undergo aldol condensation upon heating in the presence of a catalyst. Further condensation of acetaldehyde can occur to form a conjugated structure which may be a principal chromophore in polyethylene terephthalate.

Because of the effect acetaldehyde imparts to PET articles and substances contained therein, it has been attempted to remove the acetaldehyde from the PET resin. One known method of removal is by heating the resin under reduced pressure, but has been found insufficient in removing all the acetaldehyde.

Another known method consists of further polymerizing the prepolymer at a temperature of from 270° to 290° C. for less than thirty minutes to achieve an intrinsic viscosity of about 0.4 to 0.6 and then further polymerizing the reaction product of step one in the solid state to provide a stable resin with an intrinsic viscosity of at least 0.7.

All intrinsic viscosity numbers hereinafter referred to as I.V., were measured in a 60/40 phenol/tetrachloroethane mixed solvent at 30° C.

One known method involves a process whereby during thermal processing of saturated polyesters in the molten state, gaseous oxygen is excluded and as a result, acetaldehyde formation is minimized. This involves a process in which all gaseous elemental oxygen is excluded from contacting the polymer, including the step of purging oxygen containing gases from the atmosphere in contact with the polyester by means of an inert gas, before raising the temperature of the polyester to the molten condition and physically working the polyester.

Another known process relates to the removal of acetaldehyde from crystalline PET granules by passing a dry inert gas through a bed of resin at a temperature of 170° C. to 250° C. for a time sufficient to remove the acetaldehyde. This process is conducted prior to extrusion of the resin.

SUMMARY OF THE INVENTION

When air or oxygen is in contact with hot or especially molten polyester resin, the polyester degrades and becomes discolored. Thereafter, when the polyester is extruded, the high stress and high thermal degradation produces additional color forming by-products, including additional acetaldehyde. Unexpectedly, when molecular sieves are used as a filter media during extrusion, a major improvement in the brightness and color of the extruded polyester results. In addition a reduction in the acetaldehyde content of the formed article is achieved.

DETAILS OF DESCRIPTION

There is disclosed a method of treating molten polyester resin by heating the resin to a temperature of from 230° C. to about 300° C. and passing the resin through a molecular sieve.

The present invention relates to a process of using molecular sieves to reduce the level of acetaldehyde and improving the brightness and color of polyester resins. The level of acetaldehyde has consistently been a problem facing the art. For example, the addition of levels of acetaldehyde as low as 60 parts per billion by weight have altered the tastes of carbonated cola beverages. Other food stuffs have different taste threshold levels which may be exceeded if the acetaldehyde level is not minimized. Desirably, when a container is utilized to contain food stuffs or liquids such as beverages, the amount of acetaldehyde diffusing from the container walls (e.g., a 2-liter bottle) of an empty, freshly blown bottle is less than 3 micrograms per liter. This test is conducted by maintaining the freshly blown container at 70° F. for twenty-four hours, and then analyzing the headspace gases content therein to determine the amount by weight of acetaldehyde. Generally, it has been found that where the acetaldehyde content is less than 3 micrograms per liter of volume in a container within twenty-four hours after preparation thereof, any remaining accumulation of acetaldehyde is low and presents no discernible taste in a beverage, food stuff, or the like with longer periods of storage. Improved color in the formed article is obtained.

A molecular sieve is an adsorptive desiccant belonging to a class of minerals known as zeolites. The outstanding characteristic of these materials is their ability to undergo dehydration with little or no change in crystalline structure. The dehydrated crystals are interlaced with regularly spaced channels of molecular dimension. This network of uniform pores comprises almost 50 percent of the total volume of the crystals. The empty cavities in activated "molecular sieve" crystals have a strong tendency to recapture the water molecules that have been driven off. This tendency is so strong that if no water is present they will accept any material that can get into the cavity. However, only those molecules that are small enough to pass through the pores of the crystal can enter the cavities and be adsorbed on the interior surface. This sieving or screening action, which makes it possible to separate smaller molecules from larger ones, is the most unusual characteristic of molecular sieves.

A zeolite is a natural hydrated silicate of aluminum and either sodium, calcium, potassium, or any combination thereof, or an artificial ion exchange resin. Artificial zeolites are made in a variety of forms ranging from gelatinous to porous and sandlike. They include such diverse groups of compounds of sulfonated organics or basic resins, which act in a similar manner to effect either cation or anion exchange.

The fundamental building block of the molecular sieve crystal structure is a tetrahedron of four oxygen anions surrounding the smaller silicon or aluminum cation. The sodium ion or other cation serves to make up the positive charge deficit in the alumina tetrahydra. Each of the four oxygen anions is shared, in turn, with another silica or alumina tetrahydra to extend the crystal lattice in three dimensions.

There are many types of molecular sieves as differentiated by their basic pore size. The basic types are 3A (3 angstroms), 4A (4 angstroms), 5A (5 angstroms), 10X (8 angstroms) and 13X (10 angstroms). The rate at which acetaldehyde will be adsorbed on molecular sieves in any operation is dependent on four variables; (a) the rate at which the material being adsorbed can diffuse to the activated crystals within the sieve; (b) the relative size of molecules and the molecular sieve port, (c) the strength of the adsorptive forces between the molecular sieve and the acetaldehyde, and (d) the temperature.

The term "saturated polyester" encompasses a variety of materials. Well-known polyester materials include polyester fibers, polyester tire cord, plasticizers, alkyds and polyester molding resin suitable for extrusion, injection and blow molding plastic containers.

The purpose of this invention is intended to include those saturated polyesters having linear chainlike structures, which include in their backbone

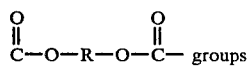

wherein R represents 1 to 10 carbon atoms, derived by reacting compounds such as dicarboxylic acids or their acid functioning derivatives with dihydric alcohols; and those polyesters having crosslinked three dimensional structures derived by reacting di- or poly-carboxylic acids with significant portions of diols and polyols such as ethylene glycol; said polyesters of copolyesters may contain alkyl or aryl or cycloalkyl or other groups which are not ethylenically unsaturated. The end valences of said

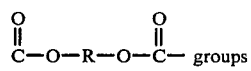

are of course bonded to carbon atoms, as will be understood. Such polyesters include, but are not limited to, polyethylene isophthalate (PEI), polybutylene terephthalate (PBT), polyethylene terephthalate (PET), copolyesters containing therein PEI, PBT and PET and preferably PET.

Representative examples of dicarboxylic acids useful in the present invention include aliphatic dicarboxylic acids such as adipic acid, azelaic acid, sebacic acid and the like; cycloaliphatic dicarboxylic acids such as hexahydroterephthalic acid and the like and aromatic dicarboxylic acids such as terephthalic acid, isophthalic acid, 2,6- and 2,7-naphthalene dicarboxylic and p,p'-diphenyl dicarboxylic acid and the like. In addition, lower alkyl esters of the above acids can be employed such as the dimethyl, diethyl, dipropyl, diisopropyl, dibutyl, diisobutyl and ditertiary butyl esters. Also, mixtures of the above acids or esters can be used to produce copolyesters. Of these acids and lower alkyl esters thereof the terephthalic acid and dimethyl terephthalate are most preferred.

The diols or glycols may be straight chained or branched. Specific examples include ethylene glycol, propylene glycol, tetramethylene glycol, 1,2-butane diol, 1,3-butane diol, 1,4-butane diol, 2,3-butane diol, neopentyl glycol, and the like. Of the various glycols, those having from 2 to 8 carbon atoms are preferred with ethylene glycol and 1,4-butane diol being highly preferred. In lieu of the various glycols, another class of polyhydric alcohols, such as the glycol ethers containing from 4 to 12 carbon atoms, can be utilized as for example dimethylene glycol and 1,4-dihydroxyethoxy benzene.

This invention is useful in processing molten polyethylene terephthalate resins. Such polymers contain in their polymer backbone a major weight portion of ethylene terephthalate units of the structure

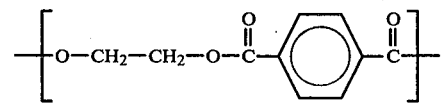

A variety of catalysts may be utilized in the production of the polyester. Such catalysts are antimony, germanium, titanium, potassium titanyl oxalate and the like. Such polyesters that are produced by such catalysts can be extruded in a manner according to the present invention to improve the color and brightness of the polyester.

One aspect of the present invention also contemplates the molecular sieve being dispersed in the molten polyester resin and thereafter removed by filtration of the molecular sieve containing the undesired by-products. The preferred method involves passing the molten polyester resin at a temperature of from 230° to about 300° C., through a filter containing molecular sieves. The temperature must be within this range to retain the polyester in its molten state.

The filter containing the molecular sieve is preferably located between an extruder outlet area and the receiving mold or forming die. The invention is applicable to injection molding, film processes and spinning.

The present invention is set forth and exemplified in the following experiment.

The following examples are supplied in order to illustrate, but not necessarily to limit, the process of our invention.

EXAMPLES I–III

Initially, 0.5 grams of a 13X type molecular sieve having 8–12 mesh beads was dried at 550° C. for 2 hours. The sample was then cooled to room temperature in a desiccator. The molecular sieve was then added to a 250 cc glass container filled with a gas sampling top and heated to 53° C. The container was charged with 50 micro liters of 0.23855% acetaldehyde/propanol/propionaldehyde standard solution, giving an initial acetaldehyde concentration of 380.5 parts per billion (ppb) weight per volume or about 2000 parts per million (ppm) weight per weight based on the amount of molecular sieve used.

The acetaldehyde content was measured at different intervals and the rate of decrease noted. The same procedure was followed for samples of the 4A and 13X type characterized by a particle size of 1-4 microns (powdered form).

The results are shown in Table 1.

The 13X molecular sieve filtered samples were run identically with the exception of an additional sample taken at 60 minutes.

Any data referring to brightness and color is based

TABLE 1

| | | | | | CH$_3$CHO | |
|---|---|---|---|---|---|---|
| Sample | Form | Particle + Size | Nominal Pore Size (A) | Time (min) | ppb $\left(\frac{w}{v}\right)$ | ppm $\left(\frac{w}{w}\right)$ |
| Example I: | | | | | | |
| 13X | Beads | 8-12 mesh 37,480-26,440 microns | 10 | 0 | 380.5 | 2177.9 |
| | | | | 3 | 332.0 | 1893.5 |
| | | | | 21 | 304.0 | 1733.8 |
| | | | | 39 | 298.0 | 1699.5 |
| | | | | 60 | 308.0 | 1756.6 |
| Example II: | | | | | | |
| 4A | Powder | 1-4 microns | 4 | 0 | 380.5 | 2025.9 |
| | | | | 3 | 43.3 | 231.1 |
| | | | | 21 | 39.3 | 209.2 |
| | | | | 39 | 37.9 | 201.8 |
| | | | | 60 | 37.6 | 200.2 |
| Example III: | | | | | | |
| 13X | Powder | 1-4 microns | 10 | 0 | 380.5 | 2199.3 |
| | | | | 3 | 43.1 | 249.1 |
| | | | | 21 | 37.2 | 215.0 |
| | | | | 40 | 36.7 | 212.1 |

EXAMPLES IV-V

A 13X type molecular sieve beads (8-12 mesh) were incorporated in the filter pack. The filter pack was utilized in the 1" National Rubber Machinery extruder. The polyester resin was polyethylene terephthalate with an IV of from 0.634 to 0.701. The polymer throughout was 5.2 lbs per hour. The temperature was 282.2° C.

For purposes of comparison, the control consisted of the same conditions with the exception of the spin pack. The control contained the conventional 8-12 mesh grit normally used as a filter media.

The control, polyethylene terephthalate was extruded through the normal grit pack and was sampled after the strand stabilized at 3, 8, 15, 20 and 30 minute intervals.

upon the Gardner Color System. According to this system, Rd is a measure of light reflected or brightness based on a 0 to 100 scale. The "a" value of the Gardner Color System is a measure of the green (−a) or red (+a) color present. The "b" value of the Gardner Color System is a measure of the blue (−b) or yellow (+b) color present.

As shown in Table 2 below, the molecular sieve filtered samples averaged about 40% acetaldehyde reduction compared to the control. The table also reflects the "b" color values were about 70% less and the Rd values were 10% higher. Thus, the molecular sieves in reducing the acetaldehyde content of the molten PET also improved its color quality.

While certain representative embodiments and details have been shown for the purpose of illustrating the invention, it will be apparent to those skilled in this art that various changes and modifications may be made therein without departing from the scope of the invention.

TABLE 2

| | 1" Extruder Sample Characterization of PET | | | | | | | |
|---|---|---|---|---|---|---|---|---|
| Sample | Sample Time (min.) | IV dl/gm | COOH$_6$ Eq/10$^6$ gm | Mettler MP, °C. | *Color (R-112) | | | CH$_3$CHO, ppm |
| | | | | | Rd | a | b | |
| | Resin Control Strand | 0.701 | 23 | 256.8 | 57.5 | −1.8 | 0.6 | 3.7 |
| Experiment IV Without Mol. Sieve - | A 0 | 0.670 | 32 | — | 54.7 | −2.2 | 2.5 | 14.2 |
| | B 3 | 0.686 | 30 | — | 54.6 | −2.2 | 2.4 | 13.4 |
| | C 8 | 0.681 | 27 | — | 50.9 | −2.1 | 2.1 | 12.7 |
| | D 15 | 0.647 | 30 | — | 54.9 | −2.4 | 2.1 | 13.0 |
| | E 20 | 0.653 | 25 | — | 54.4 | −2.4 | 2.1 | 12.2 |
| | F 30 | 0.656 | 25 | — | 52.6 | −2.2 | 2.1 | 14.2 |
| Experiment V | Strand | | | | | | | |
| 13X - | A 0 | 0.649 | 34 | — | 63.0 | −2.4 | 0.3 | 7.0 |
| | B 3 | 0.648 | 30 | — | 59.5 | −2.6 | 0.9 | 9.4 |
| | C 8 | 0.649 | 32 | — | 58.8 | −2.4 | 0.3 | 8.3 |
| | D 15 | 0.647 | 30 | — | 58.9 | −1.9 | 1.1 | 7.9 |
| | E 20 | 0.653 | 30 | — | 58.2 | −2.2 | 0.2 | 8.0 |
| | F 30 | 0.656 | 33 | — | 59.0 | −1.9 | 0.9 | 7.8 |

TABLE 2-continued

1" Extruder Sample Characterization of PET

| Sample | Sample Time (min.) | IV dl/gm | COOH$_6$ Eq/10$^6$ gm | Mettler MP, °C. | *Color (R-112) | | | CH$_3$CHO, ppm |
| --- | --- | --- | --- | --- | --- | --- | --- | --- |
| | | | | | Rd | a | b | |
| | G 60 | 0.634 | 28 | — | 56.1 | −2.4 | 0.5 | 9.8 |

*Gardner Color Meter

We claim:

1. The method of treating molten polyester resin which comprises heating said resin to a temperature of from 230° C. to about 300° C. and passing said resin through a molecular sieve.

2. The method of reducing the level of acetaldehyde from molten polyester resin which comprises passing said resin, at a temperature of from 230° C. to about 300° C., through a molecular sieve for a time sufficient to reduce the level of acetaldehyde in said resin.

3. The method of improving the brightness and color in a molten polyester resin which comprises extruding said resin through a filter containing a molecular sieve.

4. The method of claim 2 in which the said molecular sieve consists of crystalline metal alumina silicate with a three dimensional interconnecting network structure of silica and alumina tetrahedron.

5. The method of claim 2 in which the said polyester is polyethylene terephthalate.

6. The method of claim 4 in which the said metal is from the group comprising sodium, calcium, potassium or combinations thereof.

7. The method of claim 2 in which the said molecular sieve is formed of the 13X type (10 angstroms).

8. The method of claim 2 in which the said molecular sieve is formed of the 4A type (4 angstroms).

9. A filter comprising of a molecular sieve, said filter situated between an extruder outlet and a receiving mold or forming die.

* * * * *